(12) United States Patent
Bargheer et al.

(10) Patent No.: US 7,506,924 B2
(45) Date of Patent: Mar. 24, 2009

(54) MOTOR VEHICLE SEAT HAVING AN AIR SUPPLY DEVICE

(75) Inventors: Claudio Bargheer, Holzgerlingen (DE); Vasilios Orizaris, Renningen (DE); Karl Pfahler, Stuttgart (DE); Lothar Renner, Nufringen (DE)

(73) Assignee: Daimler AG, Stuttgart (DE)

( * ) Notice: Subject to any disclaimer, the term of this patent is extended or adjusted under 35 U.S.C. 154(b) by 119 days.

(21) Appl. No.: 10/554,929

(22) PCT Filed: Mar. 16, 2004

(86) PCT No.: PCT/EP2004/002687

§ 371 (c)(1),
(2), (4) Date: Aug. 4, 2006

(87) PCT Pub. No.: WO2004/096601

PCT Pub. Date: Nov. 11, 2004

(65) Prior Publication Data

US 2007/0029862 A1 Feb. 8, 2007

(30) Foreign Application Priority Data

Apr. 29, 2003 (DE) ................................. 103 19 148

(51) Int. Cl.
*B60N 2/56* (2006.01)
(52) U.S. Cl. .................................................. 297/180.14
(58) Field of Classification Search ............ 297/180.13, 297/180.14, 452.42, 452.46
See application file for complete search history.

(56) References Cited

U.S. PATENT DOCUMENTS

| 2,430,335 | A | * | 11/1947 | Hart | ........................... 454/120 |
| 4,027,888 | A | * | 6/1977 | Wilcox | .................. 297/452.17 |
| 5,102,189 | A | * | 4/1992 | Saito et al. | ............. 297/180.14 |
| 6,059,018 | A | * | 5/2000 | Yoshinori et al. | .............. 165/42 |
| 6,196,627 | B1 | * | 3/2001 | Faust et al. | ............ 297/180.14 |
| 6,277,023 | B1 | * | 8/2001 | Schwarz | ..................... 454/120 |
| 6,497,275 | B1 | * | 12/2002 | Elliot | ......................... 165/204 |
| 6,578,910 | B2 | * | 6/2003 | Andersson et al. | ..... 297/180.11 |
| 6,604,785 | B2 | * | 8/2003 | Bargheer et al. | ....... 297/180.14 |
| 6,746,076 | B2 | * | 6/2004 | Bogisch et al. | ........ 297/180.14 |
| 7,029,065 | B2 | * | 4/2006 | Laib | ..................... 297/180.13 |

* cited by examiner

*Primary Examiner*—Peter R. Brown
(74) *Attorney, Agent, or Firm*—Crowell & Moring LLP

(57) ABSTRACT

A motor vehicle seat having an air supply device by means of which an air flow can be established through a ventilation layer of the cushion of the seat in order to ventilate the seat and/or in order to heat the seat. An air outflow opening of the air supply device is arranged in the upper region of the seat and via which the head, shoulder and neck region of the seat occupant can be acted upon by an air flow. The air supply device is assigned a fan. In order to provide a motor vehicle seat with an air supply device which can be used more universally, the fan can be supplied with air from the ventilation layer of the cushion of the seat in order to generate the air flow for the head, shoulder and neck region of the seat occupant.

5 Claims, 2 Drawing Sheets

MOTOR VEHICLE SEAT HAVING AN AIR SUPPLY DEVICE

BACKGROUND OF THE INVENTION

The present invention relates to a motor vehicle seat having an air supply device and, more particularly, to a seat and air supply device by means of which an air flow can be made to flow through a ventilation layer of the cushion of the seat in order to ventilate the seat and/or in order to heat the seat, and having an air outflow opening of the air supply device, which air outflow opening is arranged in the upper region of the seat and via which the head, shoulder and neck region of the seat occupant can be acted upon by an air flow, the air supply device being assigned a fan.

DE 100 54 008 A1 shows a motor vehicle seat, in which an air flow originating from the air supply device can be made to flow through the ventilation layer of the cushion of a seat cushion or of a back rest in order to ventilate the seat and/or in order to heat the seat. In addition, the air supply device shown there comprises an air outflow opening in the upper region of the seat, via which air outflow opening the head, shoulder and neck region of the seat occupant can be supplied with an air flow. In this case, the ventilation layer of the cushion and the air outflow opening in the upper region of the seat are supplied with air via a common fan.

An object of the present invention to provide a motor vehicle seat in which the air supplies of the cushion and of the head, shoulder and neck region of the seat occupant can be combined with one another more universally.

This object has been achieved according to the invention by the fan can be supplied with air from the ventilation layer of the cushion of the seat in order to generate the air flow for the head, shoulder and neck region of the seat occupant.

In the air supply device of the motor vehicle seat according to the present invention, the fan can be supplied with air from the ventilation layer of the cushion of the seat in order to generate the air flow for the head, shoulder and neck region of the seat occupant, so that the air which is used in any case in order to ventilate the seat and/or in order to heat the seat can also be used in order to act upon the head, shoulder and neck region of the seat occupant. It is thus possible, for example, to enable the air in the ventilation layer to be preheated via the seat heating system in order subsequently to transfer it by way of the fan—optionally with heating by a further heating element—to the air outflow opening. Because the air for generating the air flow for the head, shoulder and neck region of the seat occupant passes within the ventilation layer as far as the inlet of the fan, no additional ducting needs to be provided at least in this region.

In an advantageous refinement of the invention, the ventilation layer is arranged on the suction side of the fan which generates the air flow to the head, shoulder and neck region of the seat occupant. During operation of the fan, air is thereby sucked up from the ventilation layer and at the same time air is made to flow through the ventilation layer in order to ventilate the seat. The sucked-up air is then further transported by the fan to the air outflow opening in the upper region of the seat.

A particularly advantageous construction of the cushion arises by arranging air inlet openings of the ventilation layer in the vicinity of the edge side of the cushion, and the air suction opening of the fan is provided in a central region of the cushion. By way of this arrangement, the path of the air flow between the air inlet opening of the ventilation layer and the air suction opening of the fan is approximately the same length from all sides of the cushion, with the result that a very homogeneous distribution of air is produced within the ventilation layer.

A regulating element can be provided between the fan and the air outflow opening for the head, shoulder and neck region of the seat occupant and can be used to allow at least part of the air flow generated in the fan to flow to an air outlet. If, for example, more air is required in the ventilation layer in order to ventilate the seat than is needed at the air outflow opening in order to supply the head, shoulder and neck region of the seat occupant, this air flow can be correspondingly minimized or can even be entirely suppressed via the regulating element. The excess air is correspondingly discharged via the air outlet.

In addition, a further regulating element can be provided between the ventilation layer of the cushion and the fan, and can be used to supply the fan with air from outside the ventilation layer. If, accordingly, relatively little or even no air is required within the ventilation layer, then the fan can also be supplied with air from outside the ventilation layer in order to generate the air flow for the head, shoulder and neck region of the seat occupant. In other words, the fan can be fed with air from the ventilation layer and/or from outside the ventilation layer in order to generate the air flow for the head, shoulder and neck region of the seat occupant.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
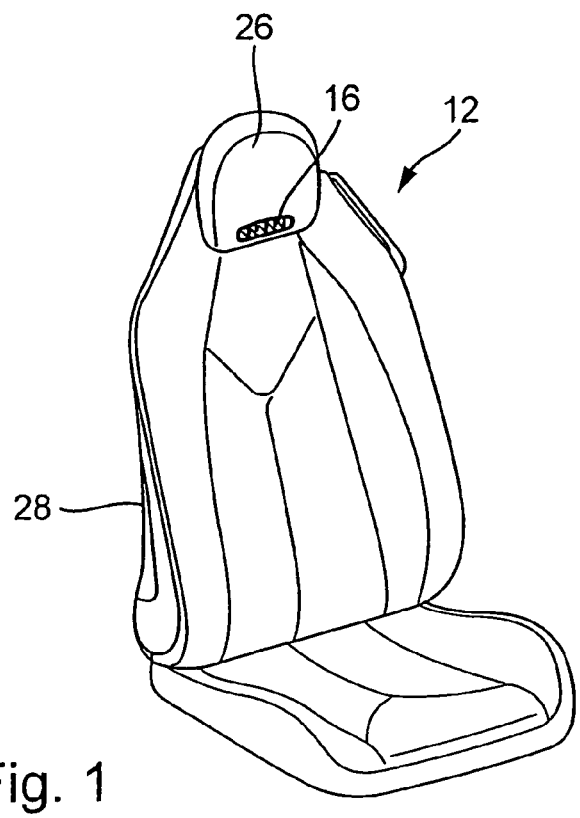
FIG. 1 is a schematic perspective view of the motor vehicle seat in the form of an integral seat according to the present invention.

Of a motor vehicle seat configured as an integral seat, FIG. 1 illustrates a seat part 10 and a backrest 12, at the upper end of which a headrest 14 (FIG. 2) is arranged in a height-adjustable manner. The headrest 14 is arranged in front of the backrest 12 overlapping with the upper region thereof. In a lower region of the headrest 14, an air outflow opening 16 is provided via which the head, shoulder and neck region of the seat occupant can be acted upon in a manner explained in detail below by an air flow from an air supply device.

Figure 2:
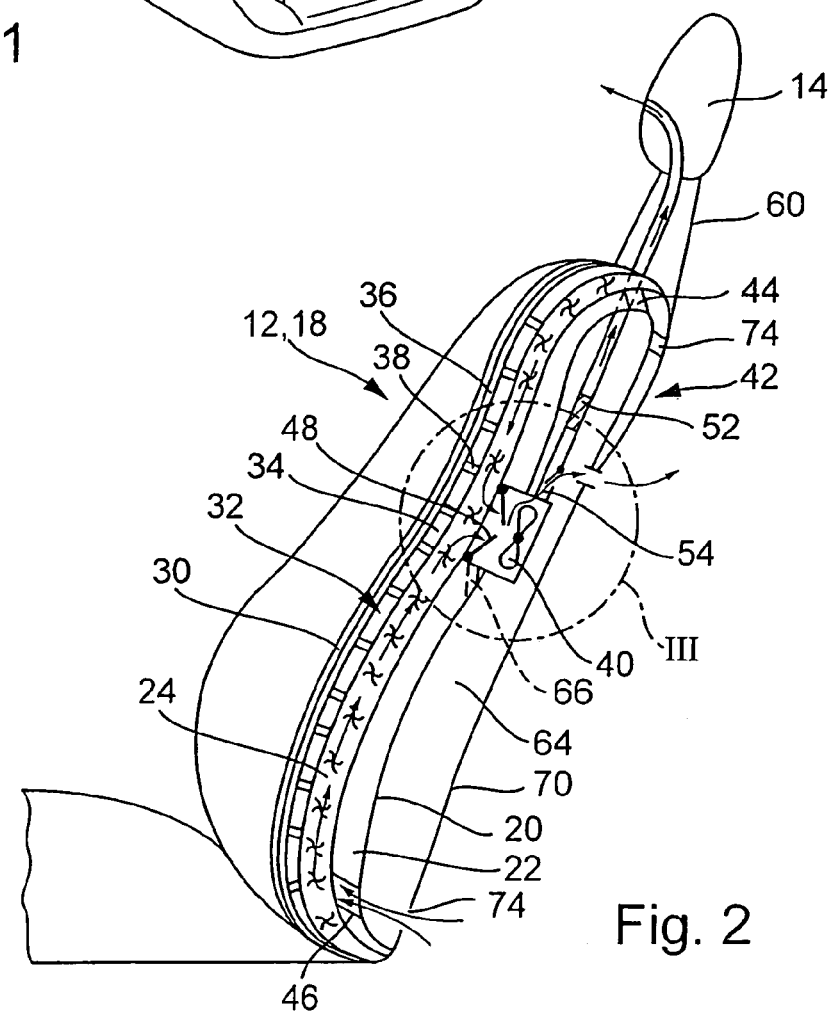
FIG. 2 is a sectional view through the backrest of the motor vehicle seat of FIG. 1 according to the invention.

In an overall view of FIG. 2, in which a diagrammatic sectional view through the backrest 12 and the headrest 14 of the vehicle seat is illustrated, the construction of the backrest 12 with its cushion 18 and the headrest 14 can be seen. Of a backrest support of the backrest 12, only a plastic covering 20 which extends over approximately the entire height of the backrest 12 can be seen in FIG. 2. A foam pad 22 which likewise runs over the entire height of the backrest 12 is arranged on the plastic covering 20. Instead of the foam pad 22, other customary cushion materials such as, for example, rubberized hair or the like, would, of course, also be contemplated.

A ventilation layer 24 which is constructed here essentially from what is referred to as a spacer knit is arranged on the foam pad 22. The spacer knit 24 has the property of being particularly readily able to have an air flow made to flow through it. The ventilation layer 24 likewise extends over approximately the entire height of the backrest 12, and, in addition, the ventilation layer 24 runs both in a central panel region 26, which can be seen in FIG. 1, and in the side cheeks 28 of the backrest 12.

An upper cushion layer 32 is provided between the ventilation layer 24 and a cushion cover 30 of the backrest 12 and comprises a lower layer 34 and an upper layer 36 in each case composed of air-permeable wadding, nonwoven wool or an open-cell foam or the like. The lower layer 34 of the upper cushion layer 32 is provided with a multiplicity of blind holes 38 which are covered by the continuously extending upper layer 36 and are arranged in the region of overlap with the ventilation layer 24. In the illustrated embodiment, heating wires (not shown) of an electric seat heating system are also arranged between the lower layer 34 and the upper layer 36 of the upper cushion layer 32. The cushion cover 30 is composed of a textile material or a perforated leather or plastic material.

Figure 3:
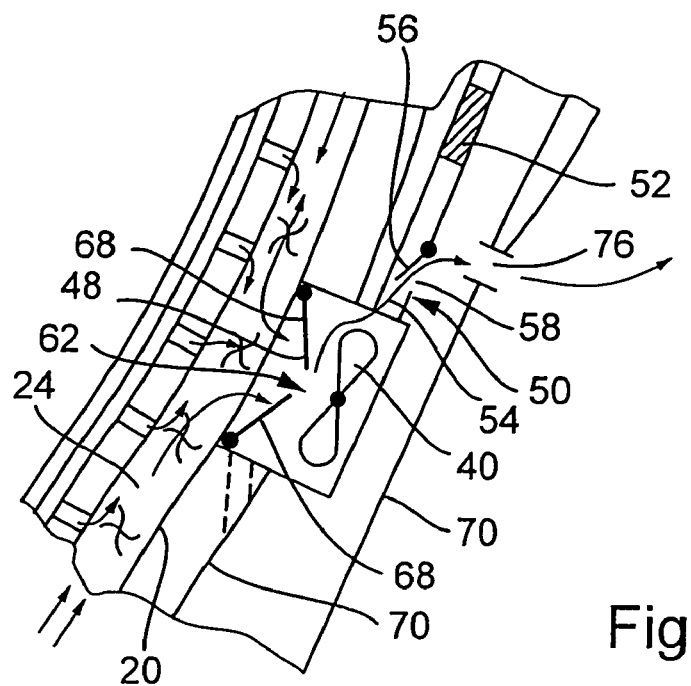
FIG. 3 is an enlarged view of the detail III in FIG. 2, illustrating the region in the vicinity of the fan of the air supply device of the seat.

On the rear side of the plastic covering 20, a fan 40 of an air supply device 42 is arranged approximately half way up in a central region of the backrest 12 as seen in FIGS. 2 and 3. Thereby, the air flow which is generate through the ventilation layer 24. For this purpose, air inlet openings 44, 46, which are hollowed out in each case from the plastic covering 20 and from the foam pad 22, are provided in the vicinity of the upper and lower edge sides of the cushion 18 of the backrest 12. The illustrated fan 40 is a radial fan, with its suction side pointing in the direction of the ventilation layer 24. Accordingly, an air suction opening 48 is hollowed out from the foam pad 22 between the ventilation layer 24 and the input side of the fan 40, so that the ventilation layer 24 is connected to the fan 40. In order to ventilate the cushion 18 of the backrest 12, an air flow (indicated diagrammatically by arrows) is made to flow through the ventilation layer 24 and can flow into the ventilation layer 24 via the air suction openings 46, 48 on the edge sides of the cushion 18 and continues to flow as far as the air suction opening 48 of the fan 40 in the central region of the cushion 18. In other words, the air flow within the ventilation layer 24 is obtained by the suction effect of the fan 40. It is clear that the ventilation layer 24 has to be separated in an at least approximately airtight manner from the foam pad 22. If, instead of the above-mentioned foam pad 22 rubberized hair or a similar air-permeable material is used, then an air-impermeable layer is also arranged between the ventilation layer 24 and the rubberized hair.

FIG. 3 best illustrates the functioning of the ventilation of the seat. When the ventilation of the seat is activated, relatively dry air is sucked by the fan 40 via the air inlet openings 46, 48 into the ventilation layer. Moisture produced by the seat occupant diffuses through the cushion cover 30 and the upper cushion layer 32 and is absorbed by the dry air flow in the ventilation layer 24 and then sucked in the direction of the fan 40. The absorption of the moisture of the seat occupant takes place in particular in the region of the blind holes 38 of the upper cushion layer 32. Use is made here of the relatively high temperature gradients between the dry air flowing into the ventilation layer 24 and the moist, warm air of the seat occupant, as a result of which the moisture of the occupant is very readily absorbed by the air flowing in and is transported on in the direction of the fan. A blowing of the air flow against the seat occupant is avoided. If the air flow of the ventilation of the seat is used at the same time for heating the seat, then a heating element (not shown) for heating the air flow is necessary, for example, in front of the entrance into the ventilation layer 24. In that case, the previously described seat heating system using resistance wires in the upper cushion layer 32 can be dispensed with.

As also can be seen in particular from FIG. 3, the air supply device 42 on the pressure side of the radial fan 40 comprises a duct arrangement 50 via which the air outflow opening 16 in the upper region of the backrest 12 can be supplied with an air flow in order to supply the head, shoulder and neck region of the seat occupant. Arranged within the duct arrangement 50 is a heating element 52 in the form of what is referred to as a PTC element, with which the air flow for supplying the head, shoulder and neck region of the seat occupant can be heated. Particularly, in the case of open motor vehicles, i.e. motor vehicles with a roof which is to be opened, this air flow serves for supplying the head, shoulder and neck region of the seat occupant with warm air in order to minimize undesired drafts due to the "air roll" produced during open travel.

A regulating element 56 is arranged between the pressure-side outlet 54 of the fan 40 and the air outflow opening 16 in the upper region of the backrest 12 and can be used to allow part of or all of the air flow generated by the fan 40 to flow off via an air outlet 58. In the illustrated embodiment, the regulating element 56 can be configured as a flap 58; however, other customary regulating elements, such as, for example, rotary flaps or the like, are also contemplated. The air flow emerging at the air outflow opening 16 can therefore be adjusted or shut off by the regulating element 56. The air duct 50 runs upward in a concealed manner between the headrest 14 and a covering part 60 of the backrest 12, so that only the air outflow opening 16 of the duct arrangement 50 can be seen from the outside.

Between the ventilation layer 24 and the input side of the fan 40, a further regulating element 62 is provided within the air suction opening 48. This regulating element 62 allows an adjustment to be made as to whether the fan 40 is to flow into the fan 40 on the input side with air from the ventilation layer 24 or else from an intermediate space 64 (also described below) via an air inlet duct 66.

Of course, intermediate positions of the regulating element 62 are also possible, so that both air from the ventilation layer 24 and air from the intermediate space 64 can pass at the same time into the fan 40. If, accordingly, only air from the ventilation layer 24 is to pass into the fan 40, then the two flaps 68 of the regulating element 62 are completely opened, as a result of which the air suction duct 66 is closed at the same time by way of the lower flap 68. If only air from the intermediate space 64 is sucked up, then the flaps 68, in the illustrated embodiment, are to be adjusted into a vertical position, bearing against the ventilation layer 24.

The effect which can therefore be achieved by this regulating element 62 is that, for example, the air outflow opening 16 can be supplied with an air flow without the ventilation of the seat needing to be activated at the same time. In this case, the two flaps 68 would then be arranged in their vertical position and the air suction opening 48 closed. If the ventilation of the seat is to be operated at a medium intensity, and if, for example, the air flow at the air outflow opening 16 is to be operated at the same time at high intensity, then the two flaps 68 can be adjusted into an intermediate position—as illustrated in FIG. 3. As shown, the fan 40, with flaps 68 half open, sucks up some of the air from the ventilation layer 24 and some of the air from the intermediate space 64, as a result of which in total at the air outflow opening 16 a relatively large amount of air can be provided at the air outflow opening 16. If, by contrast, an air flow is not provided at the air outflow opening 16, then the air flow can be suppressed via the regulating element 56. When the regulating element 56 is closed, the ventilation of the seat can take place independently of the ventilation of the head, shoulder and neck region of the seat occupant.

The intermediate space 64 is bounded on the front side by the plastic covering 20 and on the rear side by a rear covering part 70 of the backrest 12. It is clear that corresponding openings 74 for the air inlet openings 44, 46 of the ventilation layer 24 and an opening 76 for the air outlet 58 can be provided in the covering part 70.

Figure 4:
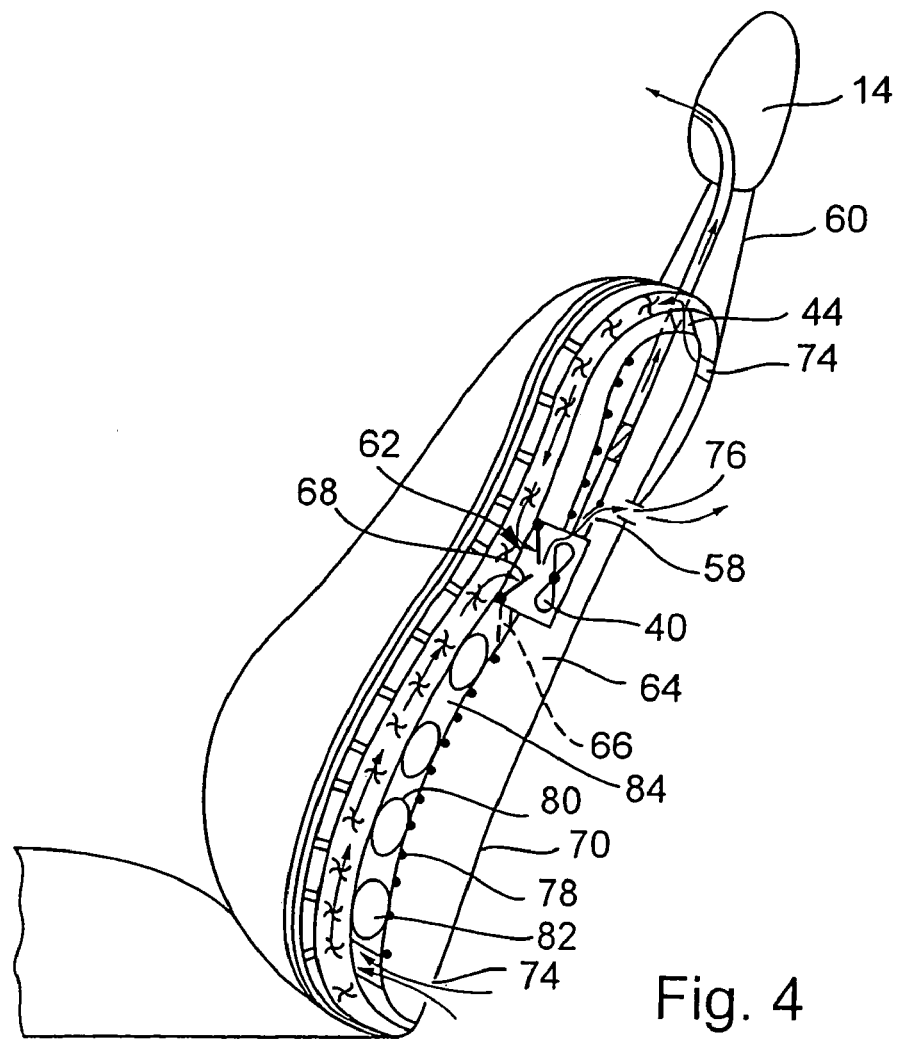
FIG. 4 is a schematic sectional view through the backrest of the motor vehicle seat according to a second embodiment of the present invention.

FIG. 4 illustrates the backrest 12 in a second embodiment of the invention. However, this embodiment differs from the first embodiment shown in FIG. 2 only by the fact that, instead of the plastic covering 20, the backrest support (not illustrated) comprises a wire framework 78 with a top layer 80, in front of which what are referred to as multi-contour bubbles 82 are arranged running horizontally and one above another. The contour of the seat can be adjusted by these multi-contour bubbles 82 being blown upon to a greater or lesser extent with air. Running in front of these multi-contour bubbles 82 is a further top layer 84 on which the foam pad 22 according to the embodiment in FIG. 2 is supported. If, instead of this foam pad 22, an air-permeable cushion material such as, for example, rubberized hair, is used, then a blocking layer (not illustrated) additionally has to be provided between the ventilation layer 24 and the rubberized hair layer 22, so that an overflowing of air from the ventilation layer 24 into the rubberized hair layer 22 is avoided.

The invention claimed is:

1. A motor vehicle seat having an air supply device for generating a ventilating air flow through a ventilation layer of a cushion of a backrest of the seat to ventilate and heat the seat, the air supply device having an air outflow opening arranged in a headrest at an upper region of the seat backrest and from which a seat occupant's head, shoulder and neck region can be acted upon by the ventilating air flow;

a fan arranged in the backrest and configured to be selectively supplied with air from the ventilation layer so as to generate the air flow for the head, shoulder and neck region of the seat occupant;

a first regulating element operatively arranged between the fan and the air outflow opening in the upper region of the seat backrest so as to allow at least part of the generated air flow to flow to an air outlet and thereby regulating the amount of air flow to the headrest; and a second regulating element operatively arranged in an air suction opening between the ventilation layer and an input side of the fan in the region of the first regulating element in the seat backrest so as to supply the fan with air from outside the ventilation layer and thereby regulating the relative amount of air from the ventilation layer and from the outside.

2. The motor vehicle seat as claimed in claim 1, wherein the fan is configured to communicate on a low pressure side thereof with air from the ventilation layer to generate the air flow.

3. The motor vehicle seat as claimed in claim 1, wherein air inlet openings of the ventilation layer are arranged in a vicinity of an edge side of the cushion, and an air suction opening of the fan is provided in a central region of the cushion.

4. The motor vehicle seat as claimed in claim 1, wherein the air supply device is integrated in the motor vehicle seat.

5. The motor vehicle seat as claimed in claim 1, wherein multi-contour bubbles are operatively arranged in the seat to provide for selective adjustment of seat contour.

* * * * *